(12) United States Patent
Scalisi

(10) Patent No.: US 9,235,943 B2
(45) Date of Patent: Jan. 12, 2016

(54) REMOTE IDENTITY VERIFICATION OF LODGING GUESTS

(71) Applicant: Joseph Frank Scalisi, Yorba Linda, CA (US)

(72) Inventor: Joseph Frank Scalisi, Yorba Linda, CA (US)

(*) Notice: Subject to any disclaimer, the term of this patent is extended or adjusted under 35 U.S.C. 154(b) by 0 days.

(21) Appl. No.: 14/512,277

(22) Filed: Oct. 10, 2014

(65) Prior Publication Data
US 2015/0363989 A1 Dec. 17, 2015

Related U.S. Application Data

(60) Provisional application No. 62/011,038, filed on Jun. 12, 2014, provisional application No. 62/011,039, filed on Jun. 12, 2014, provisional application No. 62/011,040, filed on Jun. 12, 2014.

(51) Int. Cl.
  *H04N 7/18* (2006.01)
  *G07C 9/00* (2006.01)
  *G06K 9/00* (2006.01)

(52) U.S. Cl.
  CPC ........ *G07C 9/00904* (2013.01); *G06K 9/00536* (2013.01)

(58) Field of Classification Search
  USPC ........................................................ 348/143
  See application file for complete search history.

(56) References Cited

U.S. PATENT DOCUMENTS

| 5,428,388 | A | 6/1995 | Von Bauer |
|---|---|---|---|
| 5,784,446 | A | 7/1998 | Stuart |
| 6,073,192 | A | 6/2000 | Clapp |
| 6,094,213 | A | 7/2000 | Mun |
| 6,226,031 | B1 | 5/2001 | Barraclough |
| 6,429,893 | B1 | 8/2002 | Xin |
| 6,590,604 | B1 | 7/2003 | Tucker |
| 6,661,340 | B1 | 12/2003 | Saylor |
| 6,727,811 | B1 | 4/2004 | Fendis |
| 6,753,899 | B2 | 6/2004 | Lapalme |
| 6,778,084 | B2 | 8/2004 | Chang |
| 7,015,943 | B2 | 3/2006 | Chiang |
| 7,193,644 | B2 | 3/2007 | Carter |
| 7,429,924 | B2 | 9/2008 | Langer |
| 7,477,134 | B2 | 1/2009 | Langer |
| 7,492,303 | B1 | 2/2009 | Levitan |
| 7,583,191 | B2 | 9/2009 | Zinser |

(Continued)

FOREIGN PATENT DOCUMENTS

| CN | 1902609 B | 5/2010 |
|---|---|---|
| CN | 202872976 U | 4/2013 |

(Continued)

OTHER PUBLICATIONS

DoorBot: Downloaded on Nov. 18, 2013 from http://www.craigncompany.com/home-tech-doorbot/: prior art publication at least as of Jun. 10, 2013.

(Continued)

*Primary Examiner* — Richard Torrente
(74) *Attorney, Agent, or Firm* — William J. Delfs

(57) ABSTRACT

A doorbell can be used to detect a visitor and take a picture of the visitor. The doorbell can then send the picture to a remote computing device to enable a property owner to verify the identity of the visitor before remotely giving the visitor an electronic key to the property. The electronic key can expire after a rental period to preclude unauthorized future access to the property.

18 Claims, 10 Drawing Sheets

(56) References Cited

U.S. PATENT DOCUMENTS

| | | |
|---|---|---|
| 7,738,917 B2 | 6/2010 | Ryley |
| 7,746,223 B2 | 6/2010 | Howarter |
| 7,752,070 B2 | 7/2010 | Hatcher |
| 8,016,676 B2 | 9/2011 | Carter |
| 8,139,098 B2 | 3/2012 | Carter |
| 8,144,183 B2 | 3/2012 | Carter |
| 8,144,184 B2 | 3/2012 | Carter |
| 8,154,581 B2 | 4/2012 | Carter |
| 8,164,614 B2 | 4/2012 | Carter |
| 8,193,919 B2 | 6/2012 | Langer |
| 8,504,103 B2 | 8/2013 | Ficquette |
| 8,565,399 B2 | 10/2013 | Siminoff |
| 8,780,201 B1 | 7/2014 | Scalisi |
| 8,823,795 B1 | 9/2014 | Scalisi |
| 8,842,180 B1 | 9/2014 | Scalisi |
| 2004/0085205 A1 | 5/2004 | Yeh |
| 2004/0086093 A1 | 5/2004 | Schranz |
| 2004/0229569 A1 | 11/2004 | Franz |
| 2005/0097248 A1 | 5/2005 | Kelley |
| 2005/0285944 A1 | 12/2005 | Watanabe |
| 2006/0156361 A1 | 7/2006 | Wang |
| 2006/0271678 A1 | 11/2006 | Jessup et al. |
| 2007/0126574 A1 | 6/2007 | Langer |
| 2007/0194945 A1 | 8/2007 | Atkinson |
| 2008/0036862 A1 | 2/2008 | Lang |
| 2008/0297339 A1 | 12/2008 | Mathews |
| 2009/0072963 A1 | 3/2009 | Langer |
| 2009/0141939 A1 | 6/2009 | Chambers |
| 2009/0284578 A1 | 11/2009 | Carter |
| 2010/0087161 A1 | 4/2010 | Young |
| 2010/0195810 A1 | 8/2010 | Mota |
| 2012/0113253 A1 | 5/2012 | Slater |
| 2012/0162416 A1 | 6/2012 | Su et al. |
| 2012/0262581 A1 | 10/2012 | Carter |
| 2012/0280783 A1 | 11/2012 | Gerhardt |
| 2012/0280789 A1 | 11/2012 | Gerhardt |
| 2012/0280790 A1 | 11/2012 | Gerhardt |
| 2013/0045763 A1 | 2/2013 | Ruiz |
| 2013/0057695 A1 | 3/2013 | Huisking |
| 2013/0094444 A1 | 4/2013 | Lai |
| 2013/0130749 A1 | 5/2013 | Andersen |
| 2015/0080021 A1* | 3/2015 | Bietz et al. ............ 455/456.1 |

FOREIGN PATENT DOCUMENTS

| | | |
|---|---|---|
| CN | 202939738 U | 5/2013 |
| EP | 684743 B1 | 7/1999 |
| GB | 2400958 | 10/2004 |
| WO | WO 01/93220 A1 | 12/2001 |

OTHER PUBLICATIONS

DoorBot: Downloaded on Nov. 18, 2013 from http://thenextweb.com/insider/2012/12/10/satisfaction-lies-in-hardware-for-siminoffs-christie-street-platform-and-doorbot-video-streaming-doorbell/; prior art publication at least as of Dec. 10, 2012.

DoorBot: Downloaded on Nov. 18, 2013 from http://www.digitaltrends.com/lifestyle/doorbot-camera-see-visitors-smartphone/; prior art publication at least as of Dec. 9, 2012.

DoorBot website: Downloaded on Nov. 18, 2013 from http://www.getdoorbot.com/.

DoorBot users manual: Downloaded on Nov. 18, 2013 from http://static.mydoorbot.com/DoorBot%20Users%20Manual%201.0.pdf.

DoorBot "fact sheet": Downloaded on Nov. 18, 2013 from http://cdn.shopify.com/s/files/1/0247/6501/files/DoorBotMediaKit.pdf?17037.

DoorBot "features kit": Downloaded on Nov. 18, 2013 from http://cdn.shopify.com/s/files/1/0247/6501/files/DoorBot_Features_Kit.pdf?17037.

CellNock index page: Originally downloaded on Sep. 23, 2013 from http://cellnock.com/index.html; The website says CellNock is "patent pending.".

CellNock about founder page: Downloaded on Nov. 18, 2013 from http://cellnock.com/index.html; The website says CellNock is "patent pending.".

CellNock learn more page: Downloaded on Nov. 18, 2013 from http://cellnock.com/learn_more.htm; The website says CellNock is "patent pending.".

CellNock product page: Downloaded on Nov. 18, 2013 from http://cellnock.com/products.htm; The website says CellNock is "patent pending.".

Philips InSight Baby Monitor: Originally downloaded on Jul. 24, 2013 from http://www.amazon.com/Philips-B120-37-InSight-Wireless/dp/B00AALO9Z6/ref=sr_1_3?ie=UTF8&qid=1384808431&sr=8-3&keywords=philips+insight.

MySkyBell.com—Part 1 (previously iDoorCam.com): Downloaded on Nov. 18, 2013 from http://www.myskybell.com/.

MySkyBell.com—Part 2 (previously iDoorCam.com): Downloaded on Nov. 18, 2013 from http://www.myskybell.com/.

MySkyBell.com—Part 3 (previously iDoorCam.com): Downloaded on Nov. 18, 2013 from http://www.myskybell.com/.

MySkyBell.com—Part 4 (previously iDoorCam.com): Downloaded on Nov. 18, 2013 from http://www.myskybell.com/.

MySkyBell.com—Part 5 (previously iDoorCam.com): Downloaded on Nov. 18, 2013 from http://www.myskybell.com/.

Squaritz IDS Doorbell System—Downloaded on Aug. 15, 2013 from http://www.indiegogo.com/projects/squaritz-ids-intelligent-doorbell-system.

MyBells—Downloaded on Nov. 18, 2013 from http://www.indiegogo.com/projects/mybells-the-smart-bells.

Wireless video doorbell pager—Downloaded on Aug. 9, 2013 from http://www.indiegogo.com/projects/wireless-video-doorbell-pager--4.

Lockitron—Downloaded on Jul. 24, 2013 from https://lockitron.com/preorder.

EyeTalk for home—Downloaded on May 2013 from http://www.revolutionaryconceptsinc.com/forhome.html.

EyeTalk Product—Downloaded on Nov. 18, 2013 from http://www.revolutionaryconceptsinc.com/eyetalk.html.

Langer Doorbell Light—Downloaded on Nov. 18, 2013 from http://www.youtube.com/watch?v=u9nNCm4tSYI; published at least as early as Apr. 2013.

SmartBell—Downloaded on Dec. 5, 2013 from http://smartbell.co/This_is_smartbell.html.

SmartBell—Downloaded on Dec. 5, 2013 from http://smartbell.co/Tech_specs.html.

SmartBell—Downloaded on Dec. 5, 2013 from http://smartbell.co/FAQ.html.

SmartBell—A Doorbell for Smartphones, published by Scrambled Brains Tech, LLC., Oct. 1, 2013.

Amazon.com Listing: "Philips InSight Wireless HD Baby Monitor," downloaded Jul. 24, 2013 from http://www.amazon.com/Philips-InSight-Wireless-Baby-Monitor/dp/B00AALO9Z6/ref=sr_1_2?ie=UTF8&qid=1374704204&sr=8-2&keywords=philips+insight+wi-fi+baby+monitor.

Cellnock.com Listing: "CellNock," downloaded Sep. 23, 2013 from http://cellnock.com/products.htm.

Cellnock.com Listing: "CellNock Index," downloaded Sep. 23, 2013 from http://cellnock.com/index.html.

Christiestreet.com Listing: "DoorBot," downloaded Jun. 14, 2013 from https://christiestreet.com/products/doorbot.

Idoorcam.com: "iDoorCam—A Wi-Fi Enabled, Webcam Doorbell," downloaded Sep. 3, 2013 from http://www.idoorcam.com/.

Indiegogo.com Listing: "Squaritz IDS—Intelligent Doorbell System," originally downloaded Aug. 15, 2013 from http://www.indiegogo.com/projects/squaritz-ids-intelligent-doorbell-system.

Indiegogo.com Listing: "wireless video doorbell pager," downloaded Aug. 9, 2013 from http://www.indiegogo.com/projects/wireless-video-doorbell-pager--4.

Lockitron.com Listing: "Lockitron," downloaded Jul. 24, 2013 from https://lockitron.com/preorder.

Revolutionary Concepts, Inc. Listing: "Eyetalk for Home," originally downloaded May 24, 2013 from http://www.revolutionaryconceptsinc.com/forhome.html.

(56) References Cited

OTHER PUBLICATIONS

DoorBot—Downloaded on Jul. 26, 2013 from http://www.getdoorbot.com.
Langer Doorbell Button Sized Light—Downloaded on Sep. 16, 2013 from http://www.youtube.com/watch?v=u9nNCm4tSYI.
Langer Doorbell Light—Downloaded on Sep. 16, 2013 from http://www.youtube.com/watch?v=6dbU-Gyjgx8.
SmartBell on Kickstarter—Downloaded on Feb. 28, 2014 from http://www.kickstarter.com/projects/1256599792/smartbell-wi-fi-doorbell-for-video-chats-to-ios-an.
August Smart Lock—Part 1—downloaded on Jun. 10, 2014 from www.August.com.
August Smart Lock—Part 2—downloaded on Jun. 10, 2014 from www.August.com.
August Smart Lock—Part 3—downloaded on Oct. 10, 2014 from www.August.com.
Kevo Lock—User guide—downloaded on Jun. 10, 2014 from http://s7d5.scene7.com/is/content/BDHHI/Kwikset/Website%20Content/Kevo/kevo-userguide-kwikset_eng.pdf.
Kevo Lock—Installation guide—downloaded on Oct. 10, 2014 from http://s7d5.scene7.com/is/content/BDHHI/Kwikset/Website%20Content/Kevo/installation_guide.pdf.
Schlage Electronic Lock—User guide—downloaded on Jun. 10, 2014 from www.schlage.com.
Lock-Style Solenoid—Downloaded on Aug. 22, 2014 from www.AdaFruit.com.
Power Matters Alliance—Downloaded on Aug. 23, 2014 from www.wikipedia.com.
Push-Pull Solenoid—Downloaded on Aug. 22, 2014 from www.AdaFruit.com.
Push-Pull Solenoid—Technical Details—Downloaded on Aug. 22, 2014 from www.AdaFruit.com.
Qi—Downloaded on Aug. 23, 2014 from www.wikipedia.com.
TP-Link—Website—Downloaded on Jul. 15, 2014 from www.tp-link.us.
TP-Link—User guide—downloaded on Jul. 15, 2014 from www.tp-link.us.
AC Adapter Spy Camera—Downloaded on Jun. 24, 2014 from ahdcameras.com.
FanFare Chime—Downloaded on Oct. 10, 2014 from https://www.kickstarter.com/projects/1040187373/1919517395?token=47099d90.
Ring Video Doorbell—Downloaded on Oct. 10, 2014 from www.ring.com.
Doorboot becomes Ring—Downloaded on Oct. 10, 2014 from http://techcrunch.com/2014/09/29/doorbot-ring-home-security-doorbell/?ncid=rss&utm_source=feedburner&utm_medium=feed&utm_campaign=Feed.

* cited by examiner

REMOTE IDENTITY VERIFICATION OF LODGING GUESTS

CROSS-REFERENCE TO RELATED APPLICATIONS

The following applications are incorporated by reference herein: U.S. Provisional Patent Application No. 61/859,070; filed Jul. 26, 2013; and entitled DOORBELL COMMUNICATION SYSTEMS AND METHODS; U.S. Provisional Patent Application No. 61/872,439; filed Aug. 30, 2013; and entitled DOORBELL COMMUNICATION SYSTEMS AND METHODS; U.S. Nonprovisional patent application Ser. No. 14/098,772; filed Dec. 6, 2013; and entitled DOORBELL COMMUNICATION SYSTEMS AND METHODS; U.S. Nonprovisional patent application Ser. No. 14/099,888; filed Dec. 6, 2013; and entitled DOORBELL COMMUNICATION SYSTEMS AND METHODS; U.S. Nonprovisional patent application Ser. No. 14/142,839; filed Dec. 28, 2013; and entitled DOORBELL COMMUNICATION SYSTEMS AND METHODS; U.S. Nonprovisional patent application Ser. No. 14/275,811; filed May 12, 2014; and entitled DOORBELL COMMUNICATION SYSTEMS AND METHODS.

This application claims the benefit of U.S. Provisional Patent Application No. 62/011,038; filed Jun. 12, 2014; and entitled REMOTE IDENTITY VERIFICATION OF LODGING GUEST, the entire contents of which are incorporated by reference herein.

This application claims the benefit of U.S. Provisional Patent Application No. 62/011,039; filed Jun. 12, 2014; and entitled REMOTE IDENTITY VERIFICATION OF LODGING GUESTS BY SIMULTANEOUSLY DISPLAYING IMAGES FROM TWO SOURCES, the entire contents of which are incorporated by reference herein.

This application claims the benefit of U.S. Provisional Patent Application No. 62/011,040; filed Jun. 12, 2014; and entitled REMOTE IDENTITY VERIFICATION OF MULTIPLE LODGING GUESTS, the entire contents of which are incorporated by reference herein.

BACKGROUND

1. Field

Various embodiments disclosed herein relate to devices and methods that enable remotely located individuals to communicate. Certain embodiments relate to verifying the identity of a guest in connection with providing the guest with access to lodging.

2. Description of Related Art

Guests often arrive at a location that provides temporary lodging. A guest may ask an attendant for access to the lodging. The attendant may decide to provide a key to the guest to enable the guest to open a door to the lodging. For example, a guest can receive a hotel key that provides access to a hotel room.

Some locations that provide lodging may not have an attendant that can hand out keys. Thus, there is a need to enable access to lodging without requiring an attendant to be present to distribute keys.

Some locations that provide lodging may wish to provide a key that only enables temporary access to the lodging (rather than long-term access to the lodging). Thus, there is a need to enable temporary lodging access while avoiding inadvertently providing long-term lodging access.

SUMMARY

Several embodiments include using a doorbell to detect a visitor while the visitor is located outside of a lodging (e.g., outside of a building, outside of a hotel room, outside of an apartment). The lodging can include an entrance (e.g., a door with a lock). The visitor can be detected while the visitor is within 30 feet of the entrance. Some embodiments include using the doorbell to take a video of the visitor while the visitor accepts lodging terms (e.g., terms required for the visitor to stay in the lodging). Example terms include a maximum number of guests, smoke-free requirements, and payment terms. Some methods include recording (e.g., storing) the video to validate that the visitor accepted the lodging terms.

A visitor can accept lodging terms in many different ways including by agreeing to lodging terms. In some embodiments, a visitor accepts lodging terms by entering into a contract that includes lodging terms. Visitors can enter into a contract verbally or by signing a contract. Visitors can use electronic devices to accept lodging terms (e.g., by clicking a button on a graphical user interface).

Some methods include using a doorbell to identify a visitor. The visitor may be seeking lodging, such as a room at a hotel or a short-term rental apartment. Methods can include obtaining the doorbell that comprises a speaker, a microphone, a camera, and a button. The button can be configurable to enable the visitor to sound a chime (e.g., a sound output device to emit a "ringing" sound).

Several methods include using the doorbell to detect the visitor while the visitor is located outside of a building to which the doorbell is attached and/or while the visitor is located within 30 feet of the doorbell. The building can comprise a door having a lock. The lock can be configured to fasten the door to inhibit (e.g., guard against) unauthorized entry into the building. In some embodiments, the building is a hotel room, a rental condominium, a timeshare, a rental apartment, a rental home, or a rental cabin. Some buildings are not rentals. As used herein, in some embodiments, a "building" can mean a portion of a structure (e.g., a hotel room inside a hotel with many rooms).

Several embodiments include using the doorbell to take an image of the visitor. The image can be a picture or a video. For example, a doorbell can have an integrated camera configured to take pictures or videos of visitors. Some embodiments include sending the image of the visitor from the doorbell to a remote computing device (e.g., a smartphone, a tablet, a laptop, a smart television, a desktop) and displaying the image of the visitor on the remote computing device (e.g., such that a user of the remote computing device can see the image).

Several methods include using the remote computing device to verify an identity of the visitor and then enabling the visitor to control the lock in response to verifying the identity of the visitor. Control of the lock comprises an ability to unlock the lock (at authorized times).

Enabling the visitor to control the lock can comprise sending a password to the visitor. The password can comprise numbers and/or letters. Some methods comprise the visitor entering the password into the lock to unlock the door. For example, the visitor can speak the password (while the microphone of the doorbell records the password and the doorbell determines whether the password is correct). In some embodiments, the visitor types the password into a keypad electrically coupled to the lock and/or to the doorbell.

Enabling the visitor to control the lock can comprise sending an electronic key to an electronic device in possession of the visitor. For example, a remote database and/or the remote computing device can send the electronic key to the cellular telephone of the visitor. The electronic key can be configured to enable unlocking the lock. In some embodiments, bringing the electronic device in close proximity (e.g., within communication distance) of the lock can permit the electronic key to enable unlocking the lock. The electronic key can be sent via a Short Message Service (SMS), via an email, or via a software application. In some embodiments, the electronic key is sent wirelessly from the property manager to the visitor such that the property manager (e.g., an owner) does not have to be physically present at the property to provide a key to a visitor.

Some methods for using a doorbell to identify a visitor comprise obtaining a doorbell that has a speaker, a microphone, a camera, and a button (e.g., configurable to enable the visitor to sound a chime inside and/or outside of a building). Several methods include recording a first image of the visitor in a remote database prior to the visitor approaching the doorbell.

As used herein, "approaching a doorbell" means moving (walking or running) towards a doorbell as a person approaches the building or structure to which the doorbell is attached. For example, a person who moves in a wheelchair up a walkway to a home and then comes in close proximity to a doorbell has approached the doorbell. A person driving past houses on a street is not approaching the doorbells on the street. Approaching a doorbell typically requires coming within 30 feet of the doorbell.

Some embodiments include using a doorbell to detect the visitor after the visitor has approached the doorbell while the visitor is located outside of a building to which the doorbell is attached. The building can comprise a door having a lock. The lock can be configured to fasten the door to prevent unauthorized entry into the building.

Several embodiments comprise using the doorbell to take a second image of the visitor after the visitor has approached the doorbell. Some embodiments include sending an alert to a remote computing device in response to the doorbell detecting the visitor. A doorbell can detect the visitor in many ways. For example, the visitor may press the button to ring the chime and/or may be detected by a motion sensor. The alert can be configured to notify a user of the remote computing device regarding a presence of the visitor outside of the building. For example, the user might receive a push notification on her smartphone. The user can choose to "answer" the notification by selecting a button on the smartphone.

Some embodiments include sending the first image of the visitor from the remote database to the remote computing device and/or sending the second image of the visitor from the doorbell to the remote computing device. Several embodiments include storing the first image of the visitor on the remote computing device such that the first image is ready for the remote computing device to display along with the second image. Methods can include displaying (e.g., simultaneously or one after the other) the first image and the second image of the visitor on the remote computing device and then recording whether the visitor is shown in both the first image and the second image. Some methods include verifying whether the visitor is shown in both images (or determining that different people are shown in the images). Methods can include enabling the visitor to control the lock in response to recording and/or verifying that the first image and the second image show the visitor.

Several methods include using the remote computing device to verify that the visitor is shown in both the first image and the second image; saving a third image that comprises the first image and the second image to validate that the visitor actually visited the building; sending the third image to the remote database; and/or associating a timestamp with the third image such that the timestamp is correlated with the third image in the remote database. The timestamp can represent an occasion when the visitor requested access to the building.

Various events can result in saving the third image. Some methods comprise automatically saving the third image in response to verifying that the visitor is shown in both the first image and the second image. Some methods comprise automatically saving the third image in response to displaying the first image and the second image.

In some embodiments, enabling the visitor to control the lock comprises sending an electronic key to an electronic device in possession of the visitor. The electronic key can be configured to enable unlocking the lock. Several embodiments comprise automatically saving the third image in response to sending the electronic key to the electronic device in possession of the visitor.

In several embodiments, enabling the visitor to control the lock comprises the remote computing device instructing the remote database to send the electronic key to the electronic device in possession of the visitor.

The building described herein can be many different types of buildings (including rental properties and buildings that provide lodging to travelers). In some embodiments, the building comprises a hotel, and the electronic key is configured to unlock a hotel room. The electronic device can comprises a cellular telephone, a tablet, a television, and/or a computer. Methods can comprise the visitor unlocking the hotel room using the electronic key.

Some embodiments include placing the electronic device within ten feet or within 30 feet of the lock, and then wirelessly transferring an identification code from the electronic device to the lock in order to unlock the lock.

Some methods include disabling the electronic key within ten hours after the end of a rental period. Several embodiments include disabling the electronic key when the rental period ends. Several embodiments include automatically disabling the electronic key in response to the rental period ending. Disabling the electronic key prevents the electronic key from being able to unlock the lock. As used herein, the rental period is a time in which the visitor is authorized to enter the building.

Several embodiments comprise taking at least one additional image of the visitor on each occasion the visitor unlocks the lock; associating a time and a date with each additional image; and recording the additional images, the times, and the dates in the remote database. Methods can further comprise enabling the remote computing device to display the additional images, the times, and the dates. For example, a user of the remote computing device can search through the additional images to see the visitor who entered the building at a particular entry time.

Some methods comprise selecting a first expected person profile in response to a time at which the doorbell detects the visitor. For example, if a visitor is detected on the first day of May, the system can select the profile of the person who is scheduled to rent the building on the first day of May. The user of the remote device can then determine if the visitor matches the identity of the person who is scheduled to rent the building on the first day of May. The first expected person profile can include a picture of the visitor and the name of the visitor. Methods can comprise sending the first expected person profile to the remote computing device and displaying the name on the remote computing device (e.g., along with the picture of the expected guest). The user of the remote computing device can then compare the picture of the expected guest to the live picture (e.g., a video) of the visitor currently by the doorbell. If the user is unsure of the identity of the visitor, the user can ask the visitor a security question. The answer to the security question can be displayed along with the name and the guest picture on the remote computing device.

Several embodiments include the visitor displaying her driver's license to the camera of the doorbell to enable the user of the remote computing device to verify that the name on the driver's license matches the name on the credit card used to rent and/or reserve the property.

In several embodiments, the remote database comprises the first expected person profile having a first rental period and a second expected person profile having a second rental period. The remote database can send the first expected person profile to the remote computing device if the time at which the doorbell detects the visitor is within the first rental period, and the remote database can send the second expected person profile to the remote computing device if the time at which the doorbell detects the visitor is within the second rental period.

Some embodiments use computer-based facial recognition to determine whether the visitor is shown in both the first image and the second image. For example, facial landmarks can be used to determine if both images "match" (e.g., both images show the same person).

Several methods include using a doorbell to identify one or more visitors. Methods can include obtaining the doorbell that comprises a speaker, a microphone, a camera, and a button. Several embodiments include recording a first image of a first guest in a remote database prior to the first guest approaching the doorbell; recording a second image of a second guest in the remote database prior to the second guest approaching the doorbell; and/or recording a third image of a third guest in the remote database prior to the third guest approaching the doorbell. The remote database can store guest images for later display on a remote computing device.

In some embodiments, the system needs to know which guest image to display on the remote computing device. In several embodiments, the first guest can be scheduled to rent the building during a first rental period; the second guest can be scheduled to rent the building during a second rental period; and/or the third guest can be scheduled to rent the building during a third rental period. The doorbell can detect the visitor at a time within the first rental period, which can provide the system with an indication of which guest might be the visitor at the doorway. However, this indication might not always correctly match the visitor to the correct guest profile.

The second rental period can be chronologically closest to the first rental period. The third rental period can be the next chronologically closest rental period to the first rental period.

Some embodiments include using the doorbell to take an identification image of the visitor after the visitor has approached the doorbell. Methods can include sending an alert to a remote computing device in response to the doorbell detecting the visitor. The alert can be configured to notify a user of the remote computing device regarding a presence of the visitor outside of the building. An alert can appear as a message on the remote computing device.

Several embodiments include sending the first image of the first guest and the second image of the second guest from the remote database to the remote computing device and sending the identification image of the visitor from the doorbell to the remote computing device. Embodiments can include displaying the first image and the identification image on the remote computing device, and then displaying the second image on the remote computing device in response to recording that the visitor is not the first guest. Methods can include recording whether the visitor is shown in both the second image and the identification image. Some embodiments include enabling the visitor to control the lock in response to recording that the second image and the identification image show the visitor.

Several embodiments comprise using the remote computing device to verify that the visitor is shown in both the second image and the identification image. Some embodiments include saving a fourth image that comprises the second image and the identification image to document that the visitor actually visited the building. For example, methods can include taking at least a partial screenshot of the user interface of the remote computing device to validate the transaction (e.g., that the property manager matched the images and sent an electronic key to the visitor).

Some embodiments include disabling the electronic key after an appropriate amount of time and/or after inappropriate visitor behavior. Several methods include disabling the electronic key within three hours after the end of the second rental period in which the visitor is authorized to enter the building.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments.

DETAILED DESCRIPTION

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Traditional hotels often include a lobby where a visitor goes to provide her credit card and to receive a physical key to a hotel room. Companies such as Airbnb, Inc. (based in San Francisco, Calif.) are seeking to disrupt traditional hotels by enabling individuals to rent their homes (e.g., single-family homes, apartments, condos) to strangers. This trend is becoming increasingly popular. Several websites enable property owners to rent their property to strangers: VRBO.com, HomeAway.com, WIMDU.com, 9flats.com, and Tripping.com.

There are challenges associated with renting property to strangers. For example, property owners might be justifiably concerned about keys getting into the hands of the wrong people. Moreover, property owners would benefit from a convenient way to take keys back from previous guests to preclude unwanted future access. Controlling key access is essential to protecting properties and to providing safe access to guests.

Various embodiments described herein provide means to verify the identity of individuals requesting access to lodging prior to giving the individuals access to the lodging. Some embodiments terminate access to lodging once a rental period has expired.

Figure 1:
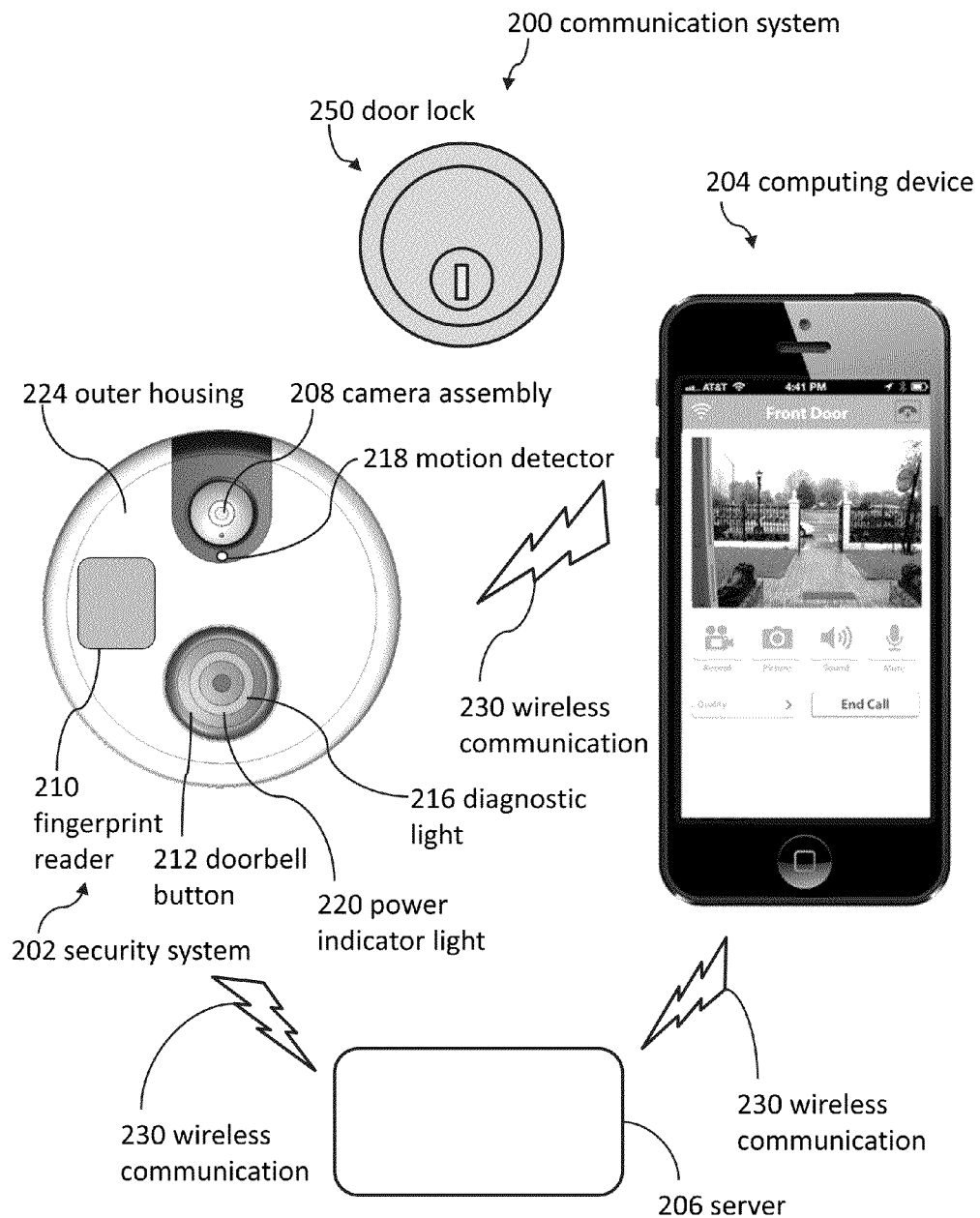
FIG. 1 illustrates a front view of a communication system, according to some embodiments.

FIG. 1 illustrates a security system 202 (e.g., a doorbell) that includes a camera assembly 208. When a visitor approaches the security system 202 (e.g., rings a doorbell 212), the security system 202 can send a wireless notification to a computing device 204 that is located remotely relative to the security system 202. For example, the owner of the rental property may be at work or even in another country.

The owner (i.e., the user) can verify the identity of the visitor as explained in more detail below. For example, the owner can see the visitor on the computing device 204. Once the owner has verified the identity of the visitor, the owner can grant the visitor access to the rental property (e.g., by unlocking the door lock 250 to let the visitor inside the rental property). The security system 202 can be configured such that it can unlock the door lock 250. In some embodiments, the security system 202 wirelessly controls the door lock 250.

The door lock 250 can include a deadbolt or other locking mechanism that locks and unlocks a door in response to remote commands. For example, the security system 202 can notify the door lock 250 to lock and unlock the door. The door lock 250 can be controlled by a remote computing device 204 (e.g., a smartphone). Example door locks 250 include Lockitron made by Apigy Inc., the August Smart Lock made by Yves Behar and Jason Johnson, electronic locks made by Schlage (a Allegion company), and the Kevo lock made by Kwikset (a division of Spectrum Brands Holdings).

In several embodiments, the "key" that the owner provides to the visitor is not a physical, metal key, but instead, is an electronic key (e.g., a virtual key). The electronic key can be configured to enable access to the property only during the rental period. After the rental period, the electronic key can be disabled by the system.

The owner can send the key to the visitor remotely such that the owner is not required to be physically present at the property to transfer the key. In some embodiments, the owner sends the key to the visitor via a text message, an email, or a software application. In several embodiments, the visitor can keep the key on her phone to enable her phone to unlock the door lock 250 during an authorized period of time (e.g., during the rental period).

The text message or email can prompt the visitor to download a software application that includes an electronic key. The software application can enable the visitor to lock and unlock the door lock 250.

Electronic keys can be sent to visitors that are located remotely from the owner. The owner can be the key administrator. The administrator can see who locked and unlocked a door in the past. The administrator can also see if a visitor failed to lock the door (e.g., during a burglary or vandalism of the lodging). A lock log can record locking data including the identity of the person using the electronic key, the computing device using the electronic key, and the time the electronic key was used to lock or unlock a door.

The owner can create new electronic keys and can disable electronic keys. Some electronic keys are configured to be automatically disabled after a period of time (e.g., after a rental period or after less than 12 hours after the end of a rental period). In some embodiments, a visitor can forward an electronic key to other people and/or to computing devices other than the computing device that first received the electronic key from the owner.

In some embodiments, the security system 202 takes a picture when the door lock 250 is unlocked and/or locked to document the identity of the person unlocking and/or locking the door. The owner can record a picture of the visitor for security purposes. If the visitor knows about the picture, the visitor will be more likely to behave appropriately. If the visitor's actions lead to property damage, the picture can be used to help prosecute the visitor.

System Embodiments

Communication systems can provide a secure and convenient way for a remotely located individual to communicate with a person who is approaching a sensor, such as a proximity sensor or motion sensor, or with a person who rings a doorbell, which can be located in a doorway, near an entrance, or within 15 feet of a door. Some communication systems allow an individual to hear, see, and talk with visitors who approach at least a portion of the communication system and/or press a button, such as a doorbell's button. For example, communication systems can use a computing device to enable a remotely located person to see, hear, and/or talk with visitors. Computing devices can include computers, laptops, tablets, mobile devices, smartphones, cellular phones, and wireless devices (e.g., cars with wireless communication). Example computing devices include the iPhone, iPad, iMac, MacBook Air, and MacBook Pro made by Apple Inc. Communication between a remotely located person and a visitor can occur via the Internet, cellular networks, telecommunication networks, and wireless networks.

Referring now to FIG. 1, communication systems can be a portion of a smart home hub. In some embodiments, the communication system 200 forms the core of the smart home hub. For example, the various systems described herein enable complete home automation. In some embodiments, the security system 202 controls various electrical items in a home (e.g., lights, air conditioners, heaters, motion sensors, garage door openers, locks, televisions, computers, entertainment systems, pool monitors, elderly monitors). In some embodiments, the computing device 204 controls the security system 202 and other electrical items in a home (e.g., lights, air conditioners, heaters, motion sensors, garage door openers, locks, televisions, computers, entertainment systems, pool monitors, elderly monitors).

FIG. 1 illustrates a front view of a communication system embodiment. The communication system 200 can include a security system 202 (e.g., a doorbell) and a computing device 204. Although the illustrated security system 202 includes many components in one housing, several security system embodiments include components in separate housings. The security system 202 can include a camera assembly 208 and a doorbell button 212. The camera assembly 208 can be a video camera, which in some embodiments is a webcam. The security system 202 can include a diagnostic light 216 and a power indicator light 220. In some embodiments, the diagnostic light 216 is a first color (e.g., blue) if the security system 202 and/or the communication system 200 is connected to a wireless Internet network and is a second color (e.g., red) if the security system 202 and/or the communication system 200 is not connected to a wireless Internet network. In some embodiments, the power indicator 220 is a first color if the security system 202 is connected to a power source. The power source can be power supplied by the building to which the security system 202 is attached. In some embodiments, the power indicator 220 is a second color or does not emit light if the security system 202 is not connected to the power source.

The security system 202 (e.g., a doorbell) can include an outer housing 224, which can be water resistant and/or waterproof. The outer housing can be made from metal or plastic, such as molded plastic with a hardness of 60 Shore D. In some embodiments, the outer housing 224 is made from brushed nickel or aluminum.

Rubber seals can be used to make the outer housing 224 water resistant or waterproof. The security system 202 can be electrically coupled to a power source, such as wires electrically connected to a building's electrical power system. In some embodiments, the security system 202 includes a battery for backup and/or primary power.

Wireless communication 230 can enable the security system 202 (e.g., a doorbell) to communicate with the computing device 204. Some embodiments enable communication via cellular and/or WiFi networks. Some embodiments enable communication via the Internet. Several embodiments enable wired communication between the security system 202 and the computing device 204. The wireless communication 230 can include the following communication means: radio, WiFi (e.g., wireless local area network), cellular, Internet, Bluetooth, telecommunication, electromagnetic, infrared, light, sonic, and microwave. Other communication means are used by some embodiments. In some embodiments, such as embodiments that include telecommunication or cellular communication means, the security system 202 can initiate voice calls or send text messages to a computing device 204 (e.g., a smartphone, a desktop computer, a tablet computer, a laptop computer).

Several embodiments use near field communication (NFC) to communicate between the computing device 204 and the security system 202; between the security system 202 and the door lock 250; between the computing device 204 and the door lock 250; between the electronic device 464 (shown in FIG. 5) and the door lock 250; and/or between the electronic device 464 and the security system 202. The security system 208, the computing device 204, the door lock 250, and/or the electronic device 464 can include a NFC tag. Some NFC technologies include Bluetooth, radio-frequency identification, and QR codes.

Figure 5:
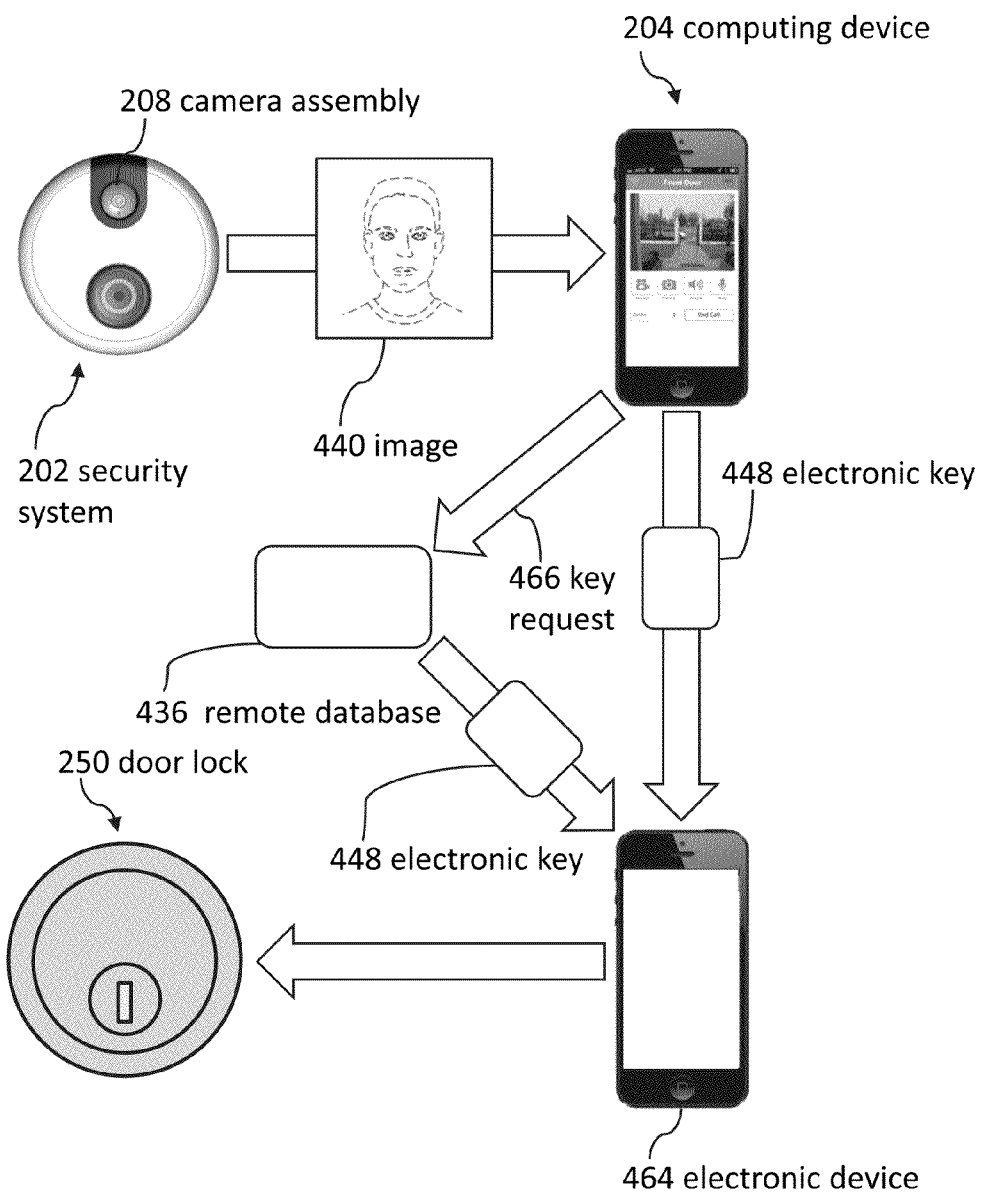

Several embodiments include wireless charging (e.g., near field charging, inductive charging) to supply power to and/or from the security system 208, the door lock 250, the computing device 204, and/or the electronic device 464 (shown in FIG. 5). Some embodiments use inductive charging (e.g., using an electromagnetic field to transfer energy between two objects).

Some embodiments include computer software (e.g., application software), which can be a mobile application designed to run on smartphones, tablet computers, and other mobile devices. Software of this nature is sometimes referred to as "app" software. Some embodiments include software designed to run on desktop computers and laptop computers.

The computing device 204 can run software with a graphical user interface. The user interface can include icons or buttons. In some embodiments, the software is configured for use with a touch-screen computing device such as a smartphone or tablet.

Figure 2:
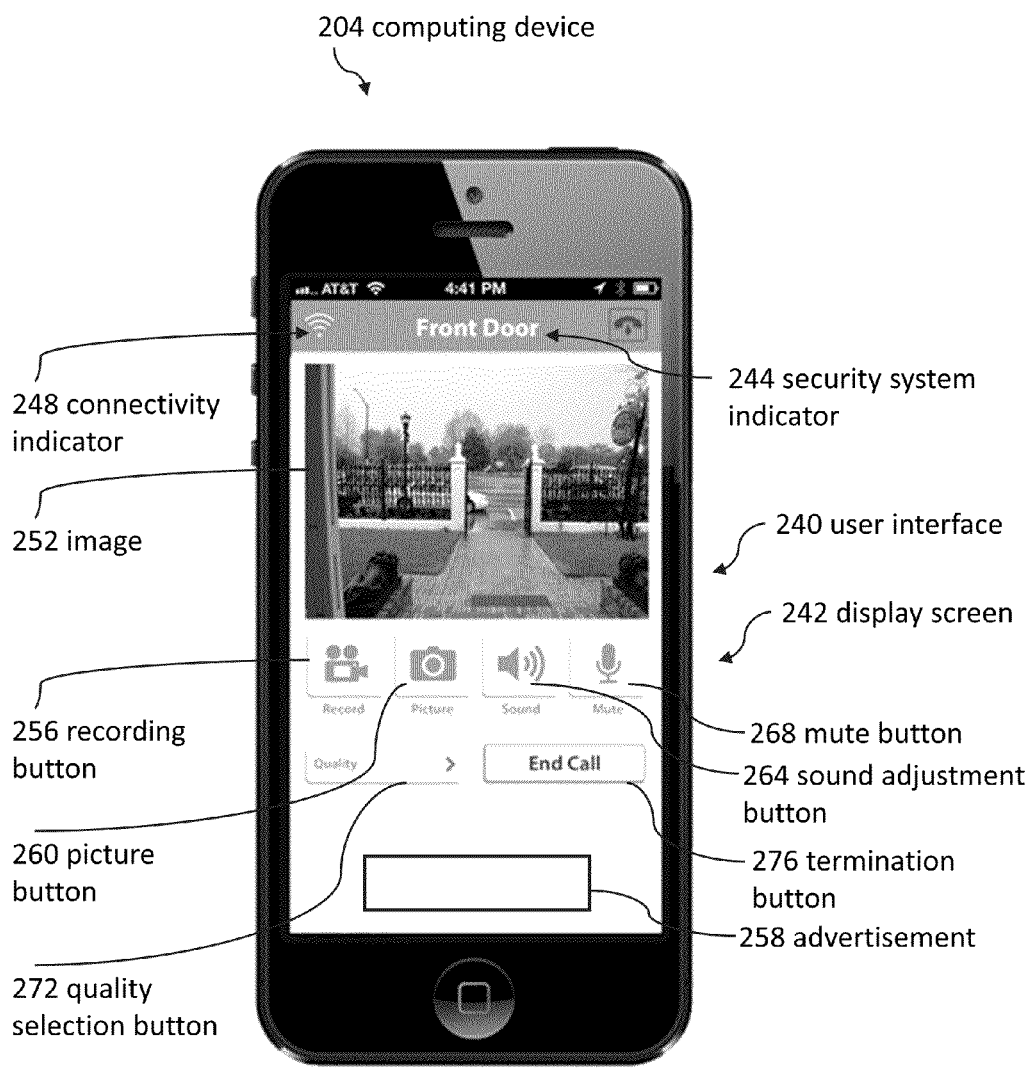
FIG. 2 illustrates a computing device running software, according to some embodiments.

FIG. 2 illustrates a computing device 204 running software. The software includes a user interface 240 displayed on a display screen 242. The user interface 240 can include a security system indicator 244, which can indicate the location of the security system that the user interface is displaying. For example, a person can use one computing device 204 to control and/or interact with multiple security systems, such as one security system located at a front door and another security system located at a back door. Selecting the security system indicator 244 can allow the user to choose another security system (e.g., the back door security system rather than the front door security system).

The user interface 240 can include a connectivity indicator 248. In some embodiments, the connectivity indicator can indicate whether the computing device is in communication with a security system, the Internet, and/or a cellular network. The connectivity indicator 248 can alert the user if the computing device 204 has lost its connection with the security system 202; the security system 202 has been damaged; the security system 202 has been stolen; the security system 202 has been removed from its mounting location; the security system 202 lost electrical power; and/or if the computing device 204 cannot communicate with the security system 202. In some embodiments, the connectivity indicator 248 alerts the user of the computing device 204 by flashing, emitting a sound, displaying a message, and/or displaying a symbol.

In some embodiments, if the security system 202 loses power, loses connectivity to the computing device 204, loses connectivity to the Internet, and/or loses connectivity to a remote server, a remote server 206 sends an alert (e.g., phone call, text message, image on the user interface 240) regarding the power and/or connectivity issue. In several embodiments, the remote server 206 can manage communication between the security system 202 and the computing device. In some embodiments, information from the security system 202 is stored by the remote server 206. In several embodiments, information from the security system 202 is stored by the remote server 206 until the information can be sent to the computing device 204, uploaded to the computing device 204, and/or displayed to the remotely located person via the computing device 204. The remote server 206 can be a computing device that stores information from the security system 202 and/or from the computing device 204. In some embodiments, the remote server 206 is located in a data center.

In some embodiments, the computing device 204 and/or the remote server 206 attempts to communicate with the security system 202. If the computing device 204 and/or the remote server 206 is unable to communicate with the security system 202, the computing device 204 and/or the remote server 206 alerts the remotely located person via the software, phone, text, a displayed message, and/or a website. In some embodiments, the computing device 204 and/or the remote server 206 attempts to communicate with the security system 202 periodically; at least every five hours and/or less than every 10 minutes; at least every 24 hours and/or less than every 60 minutes; or at least every hour and/or less than every second.

In some embodiments, the server 206 can initiate communication to the computer device 204 and/or to the security system 202. In several embodiments, the server 206 can initiate, control, and/or block communication between the computing device 204 and the security system 202.

In several embodiments, a user can log into an "app," website, and/or software on a computing device (e.g., mobile computing device, smartphone, tablet, desktop computer) to adjust the security system settings discussed herein.

In some embodiments, a computing device can enable a user to watch live video and/or hear live audio from a security system due to the user's request rather than due to actions of a visitor. Some embodiments include a computing device initiating a live video feed (or a video feed that is less than five minutes old).

In some embodiments, the user interface 240 displays an image 252 such as a still image or a video of an area near and/or in front of the security system 202. The image 252 can be taken by the camera assembly 208 and stored by the security system 202, server 206, and/or computing device 204. The user interface 240 can include a recording button 256 to enable a user to record images, videos, and/or sound from the camera assembly 208, microphone of the security system 202, and/or microphone of the computing device 204.

In several embodiments, the user interface 240 includes a picture button 260 to allow the user to take still pictures and/or videos of the area near and/or in front of the security system 202. The user interface 240 can also include a sound adjustment button 264 and a mute button 268. The user interface 240 can include camera manipulation buttons such as zoom, pan, and light adjustment buttons. In some embodiments, the camera assembly 208 automatically adjusts between Day Mode and Night Mode. Some embodiments include an infrared camera and/or infrared lights to illuminate an area near the security system 202 to enable the camera assembly 208 to provide sufficient visibility (even at night).

In some embodiments, buttons include diverse means of selecting various options, features, and functions. Buttons can be selected by mouse clicks, keyboard commands, and touching a touch screen. Many embodiments include buttons that can be selected without touch screens.

In some embodiments, the user interface 240 includes a quality selection button, which can allow a user to select the quality and/or amount of the data transmitted from the security system 202 to the computing device 204 and/or from the computing device 204 to the security system 202.

In some embodiments, video can be sent to and/or received from the computing device 204 using video chat protocols such as FaceTime (by Apple Inc.) or Skype (by Microsoft Corporation). In some embodiments, these videos are played by videoconferencing apps on the computing device 204 instead of being played by the user interface 240.

The user interface 240 can include a termination button 276 to end communication between the security system 202 and the computing device 204. In some embodiments, the termination button 276 ends the ability of the person located near the security system 202 (i.e., the visitor) to hear and/or see the user of the computing device 204, but does not end the ability of the user of the computing device 204 to hear and/or see the person located near the security system 202.

In some embodiments, a button 276 is both an answer button (to accept a communication request from a visitor) and is a termination button (to end communication between the security system 202 and the computing device 204). The button 276 can include the word "Answer" when the system is attempting to establish two-way communication between the visitor and the user. Selecting the button 276 when the system is attempting to establish two-way communication between the visitor and the user can start two-way communication. The button 276 can include the words "End Call" during two-way communication between the visitor and the user. Selecting the button 276 during two-way communication between the visitor and the user can terminate two-way communication. In some embodiments, terminating two-way communication still enables the user to see and hear the visitor. In some embodiments, terminating two-way communication causes the computing device 204 to stop showing video from the security system and to stop emitting sounds recorded by the security system.

In some embodiments, the user interface 240 opens as soon as the security system detects a visitor (e.g., senses indications of a visitor). Once the user interface 240 opens, the user can see and/or hear the visitor even before "answering" or otherwise accepting two-way communication, in several embodiments.

Some method embodiments include detecting a visitor with a security system. The methods can include causing the user interface to display on a remote computing device 204 due to the detection of the visitor (e.g., with or without user interaction). The methods can include displaying video from the security system and/or audio from the security system before the user accepts two-way communication with the visitor. The methods can include displaying video from the security system and/or audio from the security system before the user accepts the visitor's communication request. The methods can include the computing device simultaneously asking the user if the user wants to accept (e.g., answer) the communication request and displaying audio and/or video of the visitor. For example, in some embodiments, the user can see and hear the visitor via the security system before opening a means of two-way communication with the visitor.

In some embodiments, the software includes means to start the video feed on demand. For example, a user of the computing device might wonder what is happening near the security system 202. The user can open the software application on the computing device 204 and instruct the application to show live video and/or audio from the security device 202 even if no event near the security system 202 has triggered the communication.

In several embodiments, the security device 202 can be configured to record when the security device 202 detects movement and/or the presence of a person. The user of the computing device 204 can later review all video and/or audio records when the security device 202 detected movement and/or the presence of a person.

Referring now to FIG. 1, in some embodiments, the server 206 controls communication between the computing device 204 and the security system 202, which can be a doorbell with a camera, a microphone, and a speaker. In several embodiments, the server 206 does not control communication between the computing device 204 and the security system 202.

In some embodiments, data captured by the security system and/or the computing device 204 (such as videos, pictures, and audio) is stored by another remote device such as the server 206. Cloud storage, enterprise storage, and/or networked enterprise storage can be used to store video, pictures, and/or audio from the communication system 200 or from any part of the communication system 200. The user can download and/or stream stored data and/or storage video, pictures, and/or audio. For example, a user can record visitors for a year and then later can review conversations with visitors from the last year. In some embodiments, remote storage, the server 206, the computing device 204, and/or the security system 202 can store information and statistics regarding visitors and usage.

Figure 3:
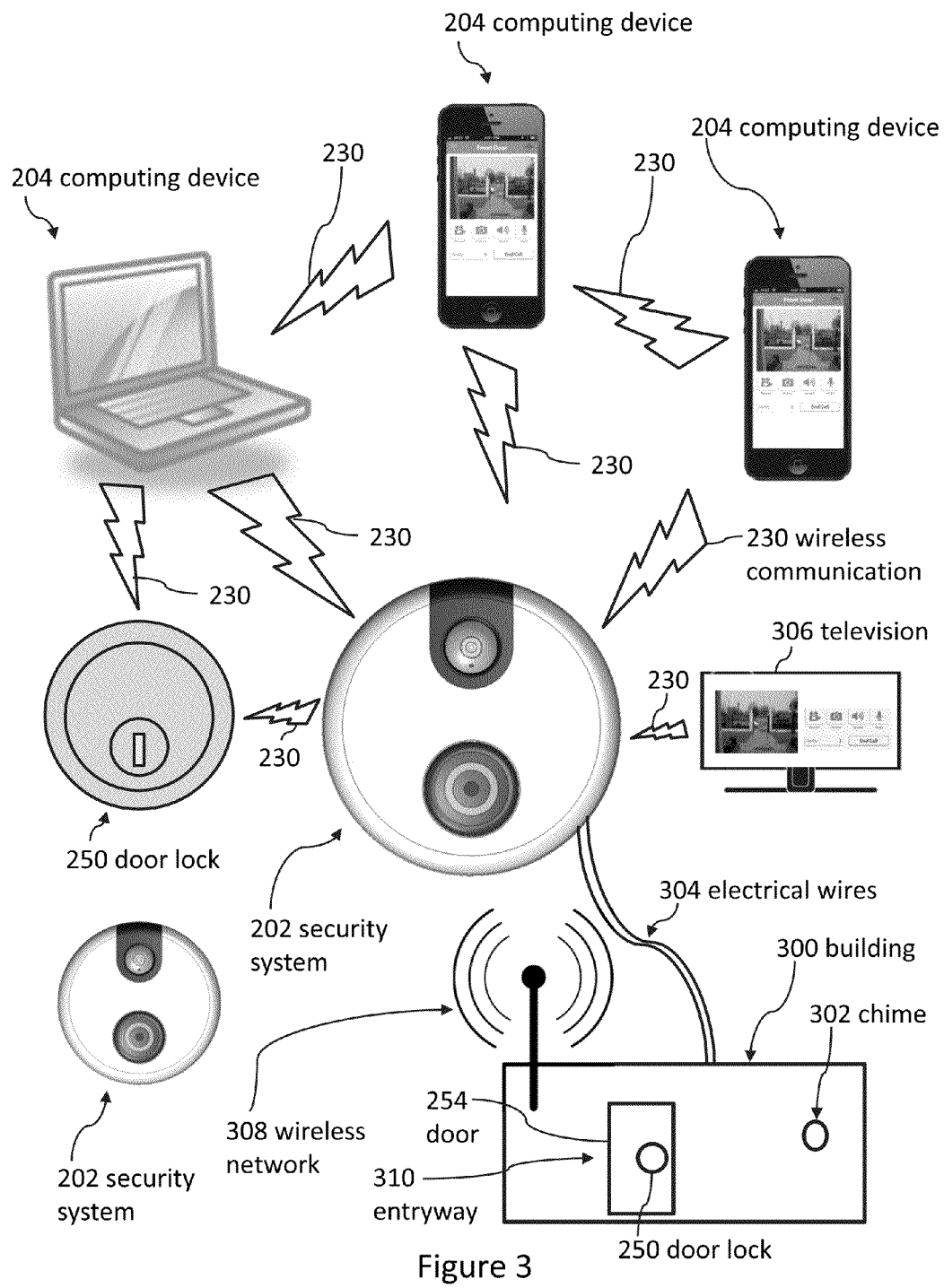
FIG. 3 illustrates an embodiment in which a security system is connected to a building, according to some embodiments.

FIG. 3 illustrates an embodiment in which a security system 202 is connected to a building 300, which can include an entryway 310 that has a door 254. A door lock 250 can be configured to lock and unlock the door 254. Electrical wires 304 can electrically couple the security system 202 to the electrical system of the building 300 such that the security system 202 can receive electrical power from the building 300.

A wireless network 308 can allow devices to wirelessly access the Internet. The security system 202 can access the Internet via the wireless network 308. The wireless network 308 can transmit data from the security system 202 to the Internet, which can transmit the data to remotely located computing devices 204. The Internet and wireless networks can transmit data from remotely located computing devices 204 to the security system 202. In some embodiments, a security system 202 connects to a home's WiFi.

As illustrated in FIG. 3, one computing device 204 (e.g., a laptop, a smartphone, a mobile computing device, a television) can communicate with multiple security systems 202. In some embodiments, multiple computing devices 204 can communicate with one security system 202.

In some embodiments, the security system 202 can communicate (e.g., wirelessly 230) with a television 306, which can be a smart television. Users can view the television 306 to see a visitor and/or talk with the visitor.

Visitor Identification Embodiments

Many embodiments utilize the visitor identification abilities of the person using the remote computing device 204 (shown in FIG. 1). Various technologies, however, can be used to help the user of the remote computing device 204 to identify the visitor. Some embodiments use automated visitor identification that does not rely on the user, some embodiments use various technologies to help the user identify the visitor, and some embodiments display images and information (e.g., a guest name) to the user, but otherwise do not help the user identify the visitor.

Referring now to FIG. 1, the camera assembly 208 can be configured to visually identify visitors through machine vision and/or image recognition. For example, the camera assembly 208 can take an image of the visitor. Software run by any portion of the system can then compare select facial features from the image to a facial database. In some embodiments, the select facial features include dimensions based on facial landmarks. For example, the distance between a visitor's eyes; the triangular shape between the eyes and nose; and the width of the mouth can be used to characterize a visitor and then to compare the visitor's characterization to a database of characterization information to match the visitor's characterization to an identity (e.g., an individual's name, authorization status, and classification). Some embodiments use three-dimensional visitor identification methods.

Some embodiments include facial recognition such that the camera assembly 208 waits until the camera assembly 208 has a good view of the person located near the security system 202 and then captures an image of the person's face.

Some embodiments include fingerprint matching to verify the identity of the visitor. A visitor can place her finger over the camera assembly 208 to enable the system 200 to detect her fingerprint. Some security system 202 embodiments include a fingerprint reader 210.

The fingerprint reader 210 can enable the system to compare the fingerprint of the visitor to a database of fingerprints to identify and/or classify the visitor. The database of fingerprints can be created by the user and/or can include a database of fingerprints from a law enforcement agency (e.g., a database of criminals).

The fingerprint reader 210 can use any suitable algorithm including minutia and pattern algorithms. The fingerprint reader 210 can analyze fingerprint patterns including arch patterns, loop patterns, and whorl patterns. The fingerprint reader 210 can include any suitable fingerprint sensor including optical, ultrasonic, passive capacitance, and active capacitance sensors.

The fingerprint reader 210 can be integrated into the outer housing 224 of the security system 202, which can be mounted within 7 feet of a door or entryway of rental lodging, such as a hotel room or an apartment for short-term rent. In some embodiments, the security system 202 can be configured to be mounted in an entryway. Some methods include mounting a security system in an entryway of a building.

The fingerprint reader 210 can be integrated into the doorbell button 212. Pressing the doorbell button 212 can enable the fingerprint reader 210 to analyze the fingerprint of the visitor.

Several embodiments can establish a visitor's identity by detecting a signal from a device associated with the visitor (e.g., detecting the visitor's smartphone). Examples of such a signal include Bluetooth, WiFi, RFID, NFC, and/or cellular telephone transmissions.

Key Distribution Embodiments

Some methods include using a doorbell to identify a visitor. The visitor may be seeking lodging, such as a room at a hotel or a short-term rental apartment. Methods can include obtaining the doorbell that comprises a speaker, a microphone, a camera, and a button. The button can be configurable to enable the visitor to sound a chime (e.g., a sound output device to emit a "ringing" sound).

Referring now to FIG. 3, several methods include using the doorbell (e.g., security system 202) to detect the visitor while the visitor is located outside of a building 300 to which the doorbell is attached and/or while the visitor is located within 30 feet of the doorbell. The building can comprise a door 254 having a lock 250. The lock 250 can be configured to fasten the door 254 to inhibit unauthorized entry into the building 300. In some embodiments, the building 300 is a hotel room, a rental condominium, a timeshare, a rental apartment, a rental home, or a rental cabin. Some buildings are not rentals.

Figure 4:
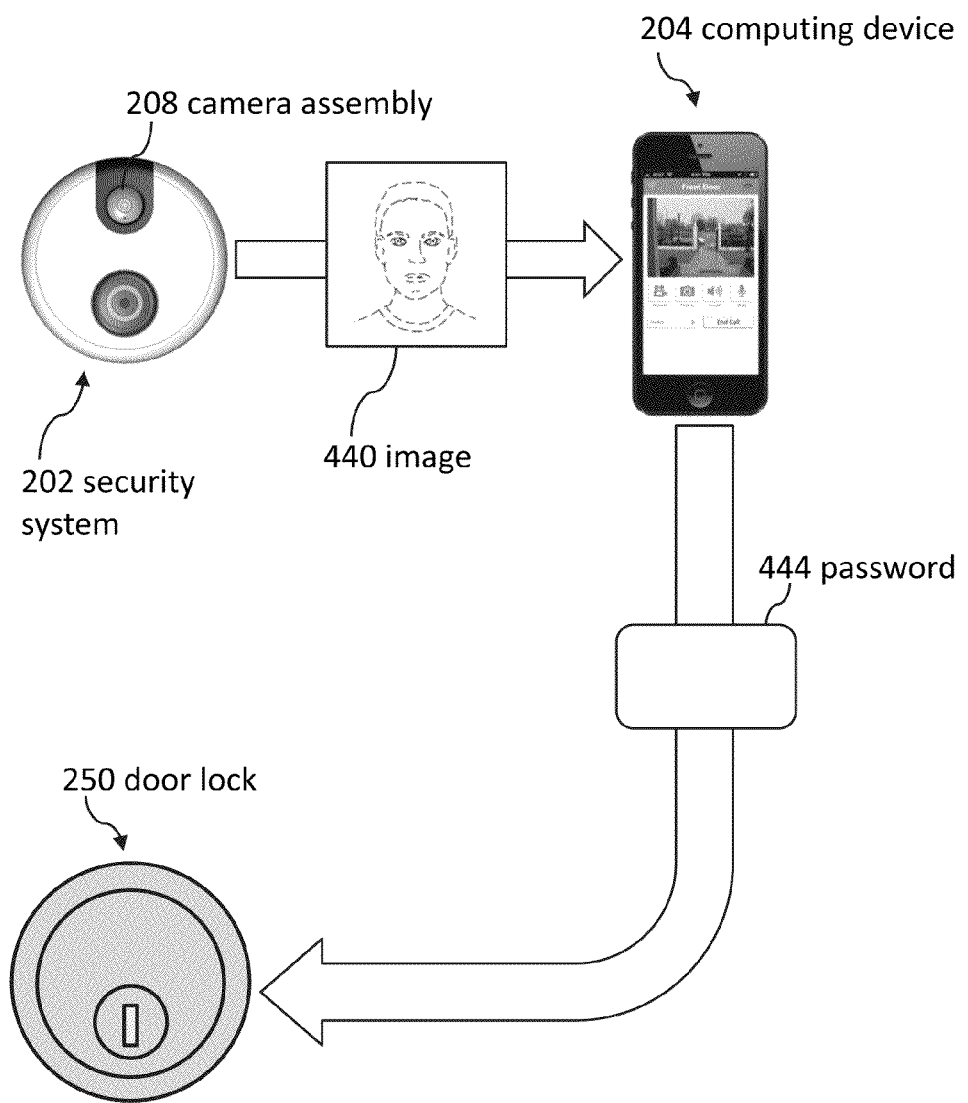
FIGS. 4-6 illustrate diagrammatic views of remote identity verification methods, according to some embodiments.

Referring now to FIG. 4, several embodiments include using the doorbell (e.g., security system 202) to take an image 440 of the visitor. The image 440 can be a picture or a video. For example, a doorbell can have an integrated camera (e.g., camera assembly 208) configured to take pictures or videos of visitors. Some embodiments include sending the image 440 of the visitor from the doorbell to a remote computing device 204 (e.g., a smartphone, a tablet, a laptop, a smart television, a desktop computer) and displaying the image of the visitor on the remote computing device 204.

The video taken by the camera assembly 208 can act as proof of the visitor accepting the terms of her stay. Some embodiments include recording a video validation of the terms of the visitor's stay (e.g., by recording the visitor's acceptance of the terms). The term acceptance and recorded validation video can be transferred from the computing device 204 to a remote database 436 (shown in FIG. 5) for storage and/or can be transferred from the security system 202 to the remote database 202 for storage.

Several methods include using the remote computing device 204 to verify an identity of the visitor and then enabling the visitor to control the lock 250 in response to verifying the identity of the visitor. Control of the lock 250 comprises an ability to unlock the lock (at authorized times).

Enabling the visitor to control the lock 250 can comprise sending a password 444 to the visitor. The password 444 can comprise numbers and/or letters. Some methods comprise the visitor entering the password into the lock 250 to unlock the door. For example, the visitor can speak the password (while the microphone of the doorbell records the password and the doorbell determines whether the password is correct). In some embodiments, the visitor types the password into a keypad electrically coupled to the lock 250 and/or to the doorbell (e.g., security system 202).

As used herein, an "electronic device" is capable of displaying images, including videos. An electronic device consumes electrical power and is capable of running software. As used herein, the term "electronic device" should not be confused with the term "electronic key." Many electronic key embodiments are not capable of displaying images, consuming electrical power, or running software.

Referring now to FIG. 5, enabling the visitor to control the lock 250 can comprise sending an electronic key 448 to an electronic device 464 in possession of the visitor. For example, a remote database 436 and/or the remote computing device 204 can send the electronic key 448 to a cellular telephone of the visitor. The computing device 204 can send a key request 466 to the remote database 436, which can then send an electronic key 448 to the electronic device 464. The key request 466 can be generated in response to the user verifying that the visitor is the intended guest for a rental period.

The electronic key 448 can be configured to enable unlocking the lock 250. In some embodiments, bringing the electronic device 448 in close proximity (e.g., within a short-range communication distance) to the lock 250 can permit the electronic key 448 to enable unlocking the lock 250. The electronic key 448 can be sent via a Short Message Service (SMS), via an email, or via a software application.

In some embodiments, the electronic key 448 is sent wirelessly from the property manager to the visitor such that the property manager (e.g., an owner) does not have to be physically present at the property (e.g., building 300 in FIG. 3) to provide a key to a visitor.

Figure 6:
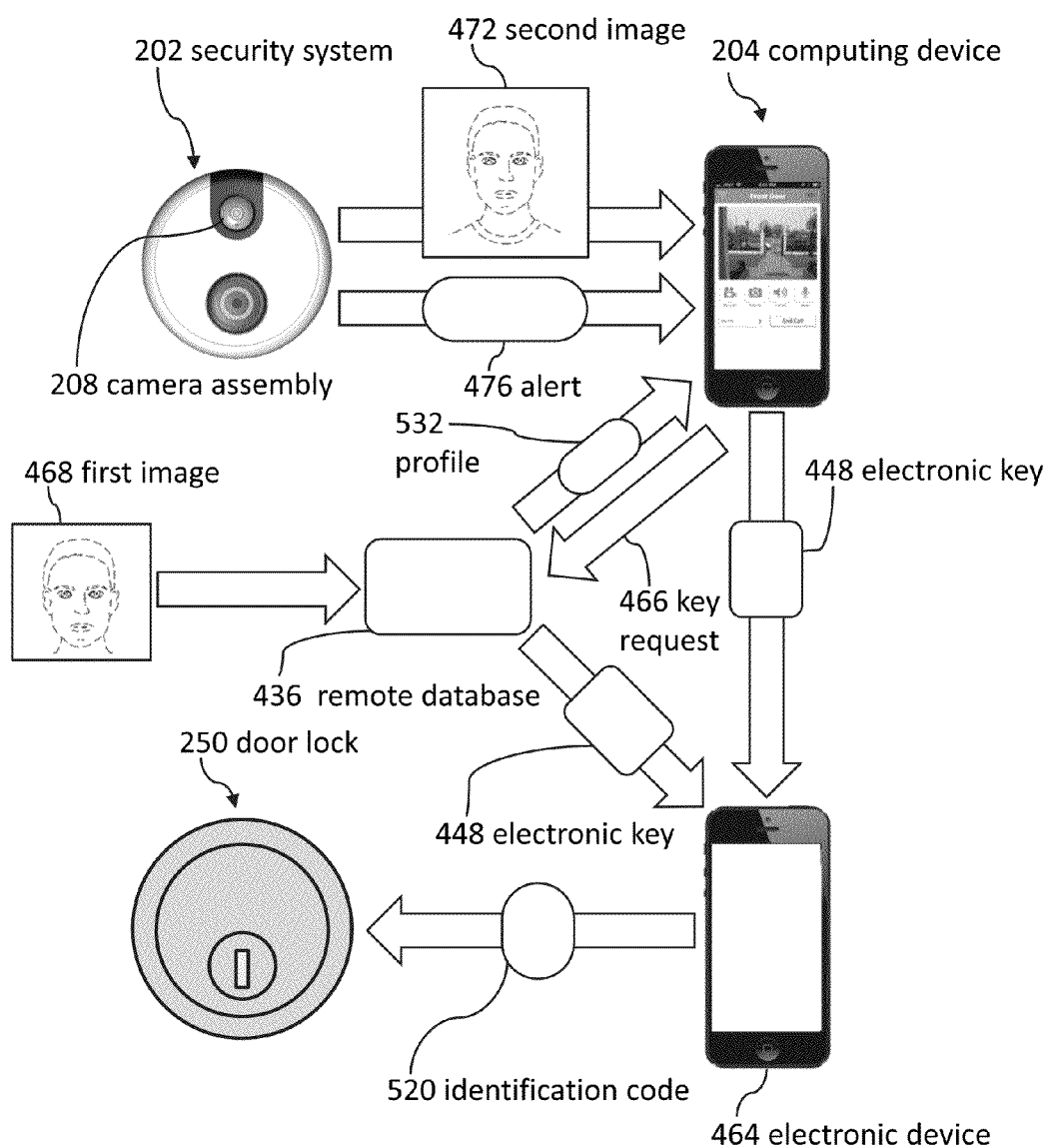

Referring now to FIG. 6, several methods include recording a first image 468 of the visitor in a remote database 436 prior to the visitor approaching the doorbell (e.g., security system 202). The visitor can upload the first image 468 via a website. The website can then transfer the first image 468 to the remote database 436. In some embodiments, a guest creates a profile using a website that facilitates booking lodging. The profile can include the first image and the name of the guest. The profile can then be associated with lodging reservations that the guest makes.

Some embodiments include using a doorbell to detect the visitor after the visitor has approached the doorbell while the visitor is located outside of a building (e.g., building 300 in FIG. 3) to which the doorbell is attached. The building can comprise a door having a lock 250. The lock 250 can be configured to fasten the door to prevent unauthorized entry into the building (without breaking down the door).

Several embodiments comprise using the doorbell to take a second image 472 of the visitor after the visitor has approached the doorbell. Some embodiments include sending an alert 476 to a remote computing device 204 in response to the doorbell (e.g., security system 202) detecting the visitor. A doorbell can detect the visitor in many ways. For example, the visitor may press the button 212 (labeled in FIG. 1) to ring the chime and/or may be detected by a motion sensor 218 (labeled in FIG. 1). The alert 476 can be configured to notify a user (e.g., a property owner or a property manager) of the remote computing device 204 regarding a presence of the visitor outside of the building 300 (shown in FIG. 3). For example, the user might receive a push notification on her smartphone. The user can choose to "answer" the notification by selecting a button (e.g., 276 shown in FIG. 2) on the smartphone.

Some embodiments include sending the first image 468 of the visitor from the remote database 436 to the remote computing device 204 and/or sending the second image 472 of the visitor from the doorbell (e.g., security system 202) to the remote computing device 202. Several embodiments include storing the first image 468 of the visitor on the remote computing device 204 such that the first image 468 is ready for the remote computing device 204 to display along with the second image 472.

In some embodiments, the electronic device 464 is a Bluetooth-enabled cellular phone that communicates with the door lock 250 via Bluetooth. The electronic device 464 can pass an authentication code (or other authentication data) to the door lock 250 via Bluetooth to enable the door lock 250 to verify that the electronic device 464 is authorized to control the door lock 250 (e.g., is authorized to unlock the door lock 250). Several embodiments include a time period in which the door lock 250 will accept that the authentication data means the electronic device 464 is authorized to control the door lock 250. Prior to the time period and/or after the time period, the door lock 250 can be configured to prevent the authentication data from enabling the electronic device 464 to unlock the door lock 250. In several embodiments, the electronic device 464 can still lock the door lock 250 after the time period, but cannot unlock the door lock 250 after the time period.

Figure 7:
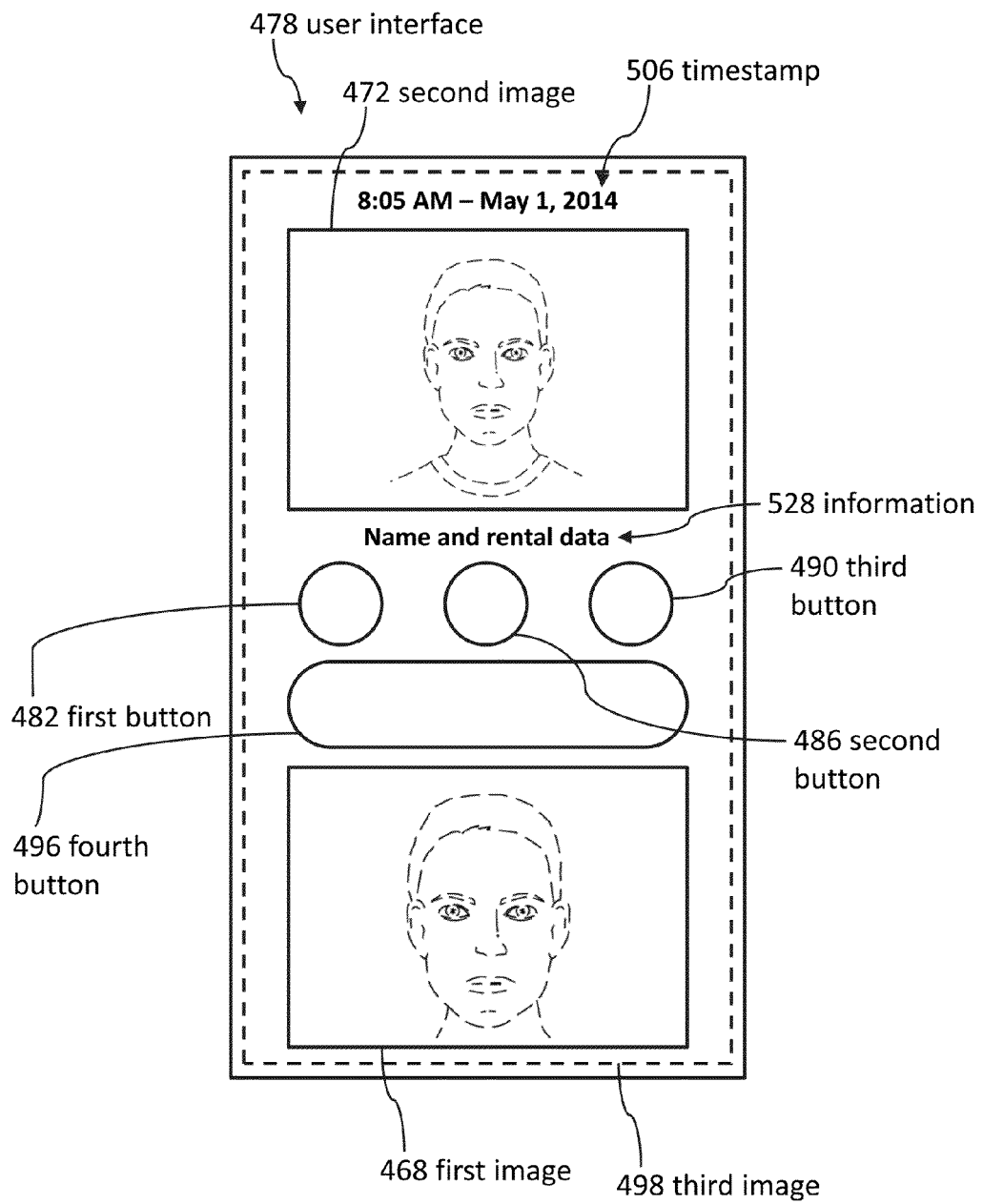
FIG. 7 illustrates a front view of a user interface, according to some embodiments.

FIG. 7 illustrates a user interface 478 that can be displayed on the computing device 204 (shown in FIG. 1). User interfaces can have many different shapes and layouts. Some user interfaces are websites. Some user interfaces are displayed on smartphones.

The user interface 478 can simultaneously display the first image 468 (e.g., an image from a guest profile) and the second image 472 (e.g., an image taken by the doorbell when a visitor approaches the doorbell). The second image 472 can be a "live" image that shows the visitor at the door in real time.

The user interface 478 can also include a first button 482, a second button 486, and a third button 490. Selecting the first button 482 can cause the doorbell to take a picture of the visitor. Selecting and/or holding the second button 486 can allow the user to talk with the visitor. Selecting the third button 490 can terminate communication between the user and the visitor.

Selecting a fourth button 496 can activate an electronic key and/or indicate that the person shown in the first image 468 is the person shown in the second image 472. Activating the electronic key, indicating that the two images show the same person, and/or selecting a button can cause the system to record an image (e.g., a screenshot of at least a portion of the user interface 478) that includes the first image 468 and the second image 472.

Several methods include using a remote computing device 204 (shown in FIG. 6) to verify that the visitor is shown in both the first image 468 and the second image 472; saving a third image 498 (e.g., the screenshot described above) that comprises the first image 468 and the second image 472 to validate that the visitor actually visited the building; sending the third image 498 to the remote database 436 (shown in FIG. 6); and/or associating a timestamp 506 with the third 498 image such that the timestamp 506 is correlated with the third image 498 in the remote database 436. The timestamp 506 can represent an occasion when the visitor requested access to the building 300 (shown in FIG. 3).

Various events can result in saving the third image 498. Some methods comprise automatically saving the third image 498 in response to verifying that the visitor is shown in both the first image 468 and the second image 472.

Methods can include displaying (e.g., simultaneously or one after the other) the first image 468 and the second image 472 of the visitor on the remote computing device 204 (shown in FIG. 6) and then recording whether the visitor is shown in both the first image 468 and the second image 472. Some methods include verifying whether the visitor is shown in both images (or determining that different people are shown in the images). Methods can include enabling the visitor to control the lock 250 (shown in FIG. 6) in response to recording and/or verifying that the first image 468 and the second image 472 show the same person. In some embodiments, the first image 468 is a still picture and the second image 472 is a real-time video. As used herein, "real-time video" means that each moment captured in the video is displayed on a remote computing device within ten seconds (i.e., with less than a ten second delay).

The user interface 478 can also display information 528 from an expected person profile. The information 528 can include the name of the expected guest (e.g., based on the time that the visitor is approaching the building). The information 528 can also include rental data (e.g., the price paid for the rental, rental dates, building identification, rental terms, special accommodations, services to be provided).

Referring now to FIGS. 6 and 7, enabling the visitor to control the lock 250 can comprise sending an electronic key 448 to an electronic device 464 in possession of the visitor. The electronic key 448 can be configured to enable unlocking the lock 250. Several embodiments comprise automatically saving the third image 498 (to validate that the visitor actually visited the building) in response to sending the electronic key 448 to the electronic device 464 in possession of the visitor.

The buildings described herein can be many different types of buildings (including rental properties and buildings that provide lodging to travelers). In some embodiments, the building comprises a hotel, and the electronic key is configured to unlock a hotel room. The electronic device 464 (shown in FIG. 6) can comprise a cellular telephone, a tablet, a television, and/or a computer. Methods can comprise the visitor unlocking the hotel room using the electronic key.

Some embodiments include placing the electronic device 464 within ten feet or within 30 feet of the lock 250, and then wirelessly transferring an identification code 520 from the electronic device 464 to the lock 250 in order to unlock the lock 250.

Some methods include disabling the electronic key 448 within ten hours after the end of a rental period. Several embodiments include disabling the electronic key 448 when the rental period ends. Disabling the electronic key prevents the electronic key 448 from being able to unlock the lock 250. As used herein, the rental period is a time in which the visitor is authorized to enter the building.

Several embodiments comprise taking at least one additional image of the visitor on each occasion the visitor unlocks the lock 250; associating a time and a date with each additional image; and recording the additional images, the times, and the dates in the remote database 250. The camera assembly 208 can take the additional pictures. Methods can further comprise enabling the remote computing device 204 to display the additional images, the times, and the dates. For example, a user of the remote computing device 204 can search through the additional images to see the visitor who entered the building at a particular entry time.

Some methods comprise selecting a first expected person profile 532 in response to a time at which the doorbell (e.g., security system 202) detects the visitor. For example, if a visitor is detected on the first day of May, the system can select the profile 532 of the person who is scheduled to rent the building on the first day of May. The user of the remote device 204 can then determine if the visitor matches the identity of the guest who is scheduled to rent the building on the first day of May. The first expected person profile 532 can include a picture of the guest (e.g., the first image 468) and the name of the guest.

Methods can comprise sending the first expected person profile 532 to the remote computing device 204 and displaying the name on the remote computing device 204 (e.g., along with the first image 468 of the expected guest). The user of the remote computing device 204 can then compare the picture of the expected guest to the live picture (e.g., a video) of the visitor currently by the doorbell. If the user is unsure of the identity of the visitor, the user can ask the visitor a security question. The correct answer to the security question can be displayed along with the name and the guest picture on the remote computing device 204.

Figure 8:
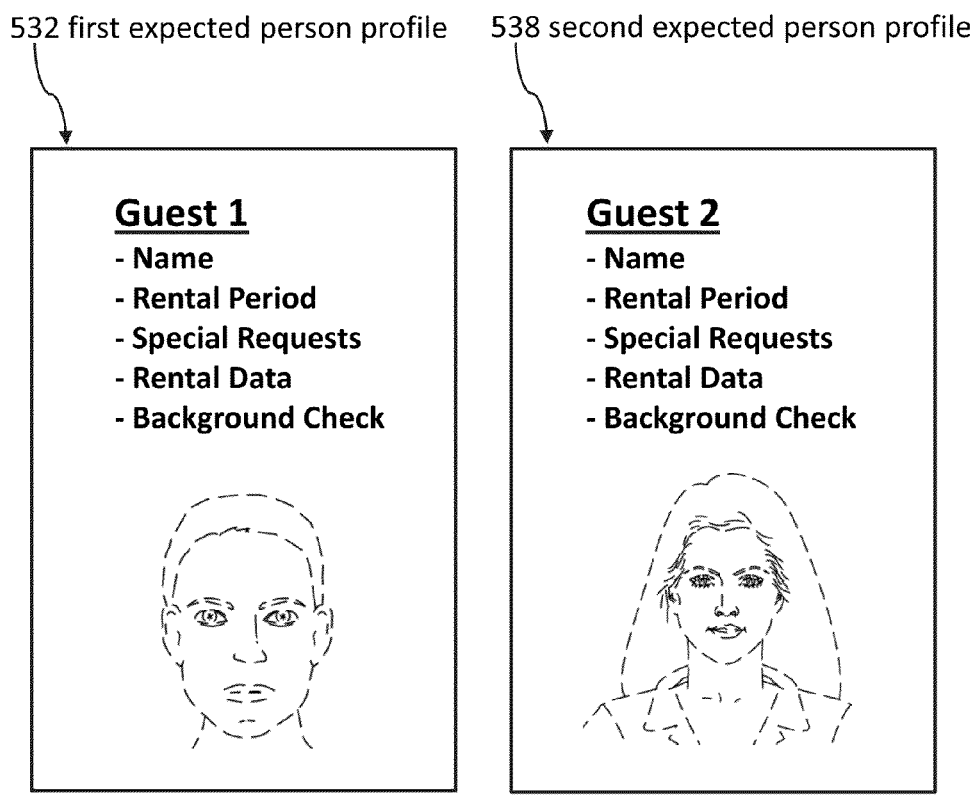
FIG. 8 illustrates a diagrammatic view of guest profiles, according to some embodiments.

FIG. 8 illustrates a first expected person profile 532 for a first guest and a second expected person profile 538 for a second guest. Several embodiments include additional expected person profiles. Each expected person profile can include a name of the guest, an image of the guest, the rental period for which the guest has reserved lodging, special requests related to the lodging, rental data (e.g., check-in time, check-out time, amount paid, payment information, rental history), and background check information (e.g., criminal record information, credit rating).

Referring now to FIGS. 6 and 8, in several embodiments, the remote database 436 comprises the first expected person profile 532 having a first rental period and a second expected person profile 538 having a second rental period. In some embodiments, the remote database 436 can send the first expected person profile 532 to the remote computing device 204 if the time at which the doorbell detects the visitor is within the first rental period, and the remote database 436 can send the second expected person profile 538 to the remote computing device 204 if the time at which the doorbell detects the visitor is within the second rental period.

In several embodiments, the computing device 204 stores the first expected person profile 532 and the second expected person profile 538, but the user interface 478 (shown in FIG. 7) displays information from the first expected person profile 532 if the time at which the doorbell detects the visitor is within the first rental period, and the user interface 478 displays information from the second expected person profile 538 if the time at which the doorbell detects the visitor is within the second rental period.

Several embodiments include recording a first image of a first guest in a remote database prior to the first guest approaching the doorbell; recording a second image of a second guest in the remote database prior to the second guest approaching the doorbell; and recording a third image of a third guest in the remote database prior to the third guest approaching the doorbell. The remote database 436 can store guest images (e.g., the first image 468) for subsequent display on the remote computing device 204. In some embodiments, the system needs to know which guest image to display on the remote computing device 204.

In several embodiments, the first guest can be scheduled to rent the building during a first rental period; the second guest can be scheduled to rent the building during a second rental period; and the third guest can be scheduled to rent the building during a third rental period. The doorbell (e.g., the security system 202) can detect the visitor at a time within the first rental period, which can provide the system (e.g., the communication system 200) with an indication of which guest might be the visitor at the doorway. However, this indication might not always correctly match the visitor to the correct guest profile (e.g., 532, 538).

The second rental period can be chronologically closest to the first rental period. The third rental period can be the next chronologically closest rental period to the first rental period.

Figure 9:
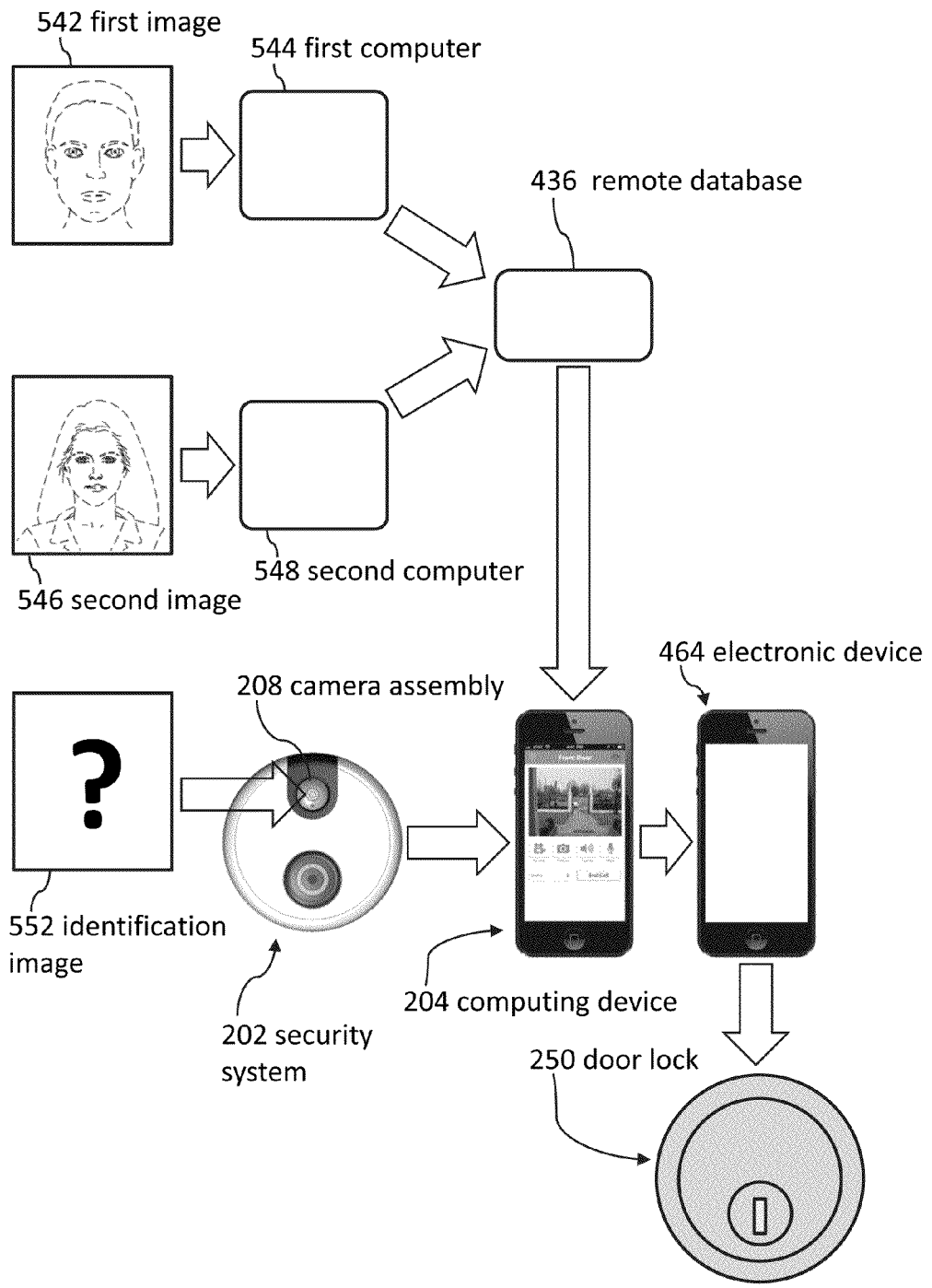
FIG. 9 illustrates a diagrammatic view of remote identity verification methods, according to some embodiments.

Referring now to FIG. 9, some embodiments include a first guest uploading a first image 542 via the Internet and a first computer 544 (e.g., a smartphone, a tablet, a laptop, a desktop). A second guest can upload a second image 546 via the Internet and a second computer 548 (e.g., a smartphone, a tablet, a laptop, a desktop). Methods can include sending the first image 542 and the second image 546 to the remote database 436 and then to the computing device 204.

Some embodiments include using the doorbell (e.g., using the camera assembly 208 of the security system 202) to take an identification image 552 of an unrecognized visitor after the visitor has approached the doorbell (e.g., the security system 202). Methods can include sending an alert 476 (shown in FIG. 6) to a remote computing device 204 in response to the doorbell detecting the visitor. The alert 476 can be configured to notify a user of the remote computing device 204 regarding a presence of the visitor outside of the building 300 (shown in FIG. 3). An alert 476 can appear as a message on the remote computing device 204.

Several embodiments include sending the first image 542 of the first guest and the second image 546 of the second guest from the remote database 436 to the remote computing device 204 and sending the identification image 552 of the visitor from the doorbell (e.g., the security system 202) to the remote computing device 204. Embodiments can include displaying the first image 542 and the identification image 552 on the remote computing device 204, and then displaying the second image 546 on the remote computing device in response to recording that the visitor is not the first guest. Methods can include recording whether the same person is shown in both the second image 546 and the identification image 546.

Some embodiments include enabling the visitor to control the lock 250 in response to recording that the second image 546 and the identification image 552 show the visitor. Lock control can be enabled by using the computing device 204 to authorize the electronic device 464 to unlock the lock 250. In some embodiments, the authorization is sent via the Internet and/or cellular networks. In some embodiments, the electronic device 464 is configured to unlock the lock 250 via Bluetooth communication between the electronic device 464 and the door lock 250. The lock authorization can expire after a rental period.

Lock History Embodiments

Figure 10:
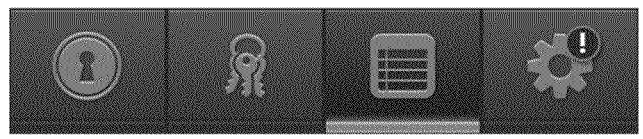
FIG. 10 illustrates a history of lock-related events displayed on a user interface, according to some embodiments.

FIG. 10 illustrates a history 570 of lock-related events displayed on a user interface (e.g., of a smartphone, tablet, laptop, desktop computer, or television). The history can include when electronic keys were sent to a guest along with the name of the guest. The history can include when a door was locked and unlocked. The history can also include when the lock was set up and/or "paired" with the electronic device 464 and/or with the computing device 204 (show in FIG. 9).

Referring now to FIG. 9, several embodiments comprise taking at least one additional image of the visitor on each occasion the visitor unlocks the lock 250; associating a time and a date with each additional image; and recording the additional images, the times, and the dates in the remote database 436. Methods can further comprise enabling the remote computing device 204 to display the additional images, the times, and the dates. For example, a user of the remote computing device 204 can search through the additional images to see the visitor who entered the building at a particular entry time (as captured in the history).

Interpretation

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

The following is claimed:

1. A method for using a doorbell to identify a visitor, the method comprising:
    obtaining the doorbell that comprises a speaker, a microphone, a camera, and a button, wherein the button is configurable to enable the visitor to sound a chime;
    recording a first image of the visitor in a remote database prior to the visitor approaching the doorbell;
    using the doorbell to detect the visitor after the visitor has approached the doorbell while the visitor is located outside of a building to which the doorbell is attached, wherein the building comprises a door having a lock, wherein the lock is configured to fasten the door to inhibit unauthorized entry into the building;
    using the doorbell to take a second image of the visitor after the visitor has approached the doorbell;
    sending an alert to a remote computing device in response to the doorbell detecting the visitor, wherein the alert is configured to notify a user of the remote computing device regarding a presence of the visitor outside of the building;
    sending the first image of the visitor from the remote database to the remote computing device and sending the second image of the visitor from the doorbell to the remote computing device;
    displaying the first image and the second image of the visitor simultaneously on the remote computing device and then recording whether the visitor is shown in both the first image and the second image;
    prompting the user of the remote computing device to determine that the visitor is shown in both the first image and the second image;
    using the remote computing device to record that the user determined that the visitor is shown in both the first image and the second image; and
    sending an electronic key to an electronic device in possession of the visitor in response to using the remote computing device to record that the user determined that the visitor is shown in both the first image and the second image, wherein the electronic key is configured to enable unlocking the lock.

2. The method of claim 1, further comprising:
    using the remote computing device to verify that the visitor is shown in both the first image and the second image;
    validating that the visitor visited the building by saving a third image that comprises the first image and the second image;
    sending the third image to the remote database; and
    associating a timestamp with the third image such that the timestamp is correlated with the third image in the remote database, wherein the timestamp represents an occasion when the visitor requested access to the building.

3. The method of claim 2, further comprising automatically saving the third image in response to verifying that the visitor is shown in both the first image and the second image.

4. The method of claim 2, further comprising automatically saving the third image to validate that the visitor actually visited the building in response to sending an electronic key to an electronic device in possession of the visitor, wherein the electronic key is configured to enable unlocking the lock.

5. The method of claim 1, wherein enabling the visitor to control the lock comprises sending an electronic key to an electronic device in possession of the visitor, wherein the electronic key is configured to enable unlocking the lock.

6. The method of claim 5, wherein enabling the visitor to control the lock comprises the remote computing device sending data to the remote database, wherein the remote database sends the electronic key to the electronic device in possession of the visitor in response to the data from the remote computing device.

7. The method of claim 5, wherein the building comprises a hotel, and the electronic key is configured to unlock a hotel room, and the electronic device comprises a cellular telephone, the method further comprising the visitor unlocking the hotel room using the cellular telephone and the electronic key.

8. The method of claim 5, further comprising sending the electronic key via a text message or via an email.

9. The method of claim 5, further comprising placing the electronic device within ten feet of the lock and wirelessly transferring an identification code from the electronic device to the lock in order to unlock the lock.

10. The method of claim 5, further comprising disabling the electronic key within ten hours after a rental period ends, wherein the rental period is a time in which the visitor is authorized to enter the building.

11. The method of claim 1, further comprising taking at least one additional image of the visitor on each occasion the visitor unlocks the lock; associating a time and a date with each additional image;
recording the additional images, the times, and the dates in the remote database; and
enabling the remote computing device to display the additional images, the times, and the dates.

12. The method of claim 1, further comprising selecting a first expected person profile in response to a time at which the doorbell detects the visitor, wherein the first expected person profile includes the first image and a name of the visitor; sending the first expected person profile to the remote computing device; and displaying the name on the remote computing device.

13. A method for using a doorbell to identify a visitor, the method comprising:
obtaining the doorbell that comprises a speaker, a microphone, a camera, and a button, wherein the button is configurable to enable the visitor to sound a chime;
recording a first image of the visitor in a remote database prior to the visitor approaching the doorbell;
using the doorbell to detect the visitor after the visitor has approached the doorbell while the visitor is located outside of a building to which the doorbell is attached, wherein the building comprises a door having a lock, wherein the lock is configured to fasten the door to inhibit unauthorized entry into the building;
using the doorbell to take a second image of the visitor after the visitor has approached the doorbell;
sending an alert to a remote computing device in response to the doorbell detecting the visitor, wherein the alert is configured to notify a user of the remote computing device regarding a presence of the visitor outside of the building;
sending the first image of the visitor from the remote database to the remote computing device and sending the second image of the visitor from the doorbell to the remote computing device;
wherein the remote database and the remote computing device are located in different locations;
displaying the first image and the second image of the visitor simultaneously on the remote computing device and then recording whether the visitor is shown in both the first image and the second image;
prompting the user of the remote computing device to determine that the visitor is shown in both the first image and the second image;
selecting a first expected person profile in response to a time at which the doorbell detects the visitor, wherein the first expected person profile includes the first image and a name of the visitor;
sending the first expected person profile to the remote computing device;
displaying the name on the remote computing device;
using the remote computing device to record that the user determined that the visitor is shown in both the first image and the second image;
wherein the remote database comprises the first expected person profile having a first rental period and a second expected person profile having a second rental period, wherein the remote database sends the first expected person profile to the remote computing device if the time at which the doorbell detects the visitor is within the first rental period and the remote database sends the second expected person profile to the remote computing device if the time at which the doorbell detects the visitor is within the second rental period; and
sending an electronic key to an electronic device in possession of the visitor in response to using the remote computing device to record that the user determined that the visitor is shown in both the first image and the second image, wherein the electronic key is configured to enable unlocking the lock.

14. The method of claim 1, wherein the remote database and the remote computing device are located in different locations.

15. The method of claim 1, further comprising using computer-based facial recognition to determine whether the visitor is shown in both the first image and the second image.

16. The method according to claim 13, wherein enabling the visitor to control the lock comprises sending an electronic key to an electronic device in possession of the visitor, wherein the electronic key is configured to enable unlocking the lock.

17. The method according to claim 13, further comprising sending the electronic key via at least one of a text message, a push notification, and an email.

18. The method according to claim 17, further comprising disabling the electronic key within three hours after an end of the second rental period in which the visitor is authorized to enter the building.

* * * * *